(12) United States Patent
Smith

(10) Patent No.: US 10,728,711 B2
(45) Date of Patent: Jul. 28, 2020

(54) OPTIMIZED URGENT SCENARIO AND EMERGENCY SCENARIO MASS/GROUP MESSAGING/NOTIFICATIONS/COMMUNICATIONS SERVICE EXPOSED/DELIVERED VIA WEB USER INTERFACE AND MOBILE DEVICE APPLICATION

(71) Applicant: Jeremy N. Smith, East Hartford, CT (US)

(72) Inventor: Jeremy N. Smith, East Hartford, CT (US)

( * ) Notice: Subject to any disclaimer, the term of this patent is extended or adjusted under 35 U.S.C. 154(b) by 0 days.

(21) Appl. No.: 15/813,153

(22) Filed: Nov. 14, 2017

(65) Prior Publication Data

US 2020/0029178 A1   Jan. 23, 2020

(51) Int. Cl.
*H04W 4/06* (2009.01)
*H04W 12/06* (2009.01)
*H04W 4/14* (2009.01)
*H04W 4/90* (2018.01)
*H04W 4/60* (2018.01)
*H04M 1/725* (2006.01)

(52) U.S. Cl.
CPC .............. *H04W 4/06* (2013.01); *H04W 12/06* (2013.01); *H04M 1/72541* (2013.01); *H04W 4/14* (2013.01); *H04W 4/60* (2018.02); *H04W 4/90* (2018.02)

(58) Field of Classification Search
CPC ........... H04W 4/08; H04W 4/14; H04W 4/90; H04W 4/029; H04W 76/50; H04W 4/00; H04W 4/021; H04M 1/72541; H04M 1/72536; H04M 2242/04; H04M 3/5116
See application file for complete search history.

(56) References Cited

U.S. PATENT DOCUMENTS

| | | | |
|---|---|---|---|
| 8,009,815 B2 | 8/2011 | Newell et al. | |
| 8,863,172 B2 | 10/2014 | Hardin et al. | |
| 9,204,277 B2 | 12/2015 | Ung, Jr. | |
| 9,319,450 B2 | 4/2016 | Daly et al. | |
| 2011/0058659 A1 | 3/2011 | Merlino | |
| 2014/0162583 A1 | 6/2014 | Daly et al. | |
| 2016/0192163 A1* | 6/2016 | Miner | H04W 4/14 455/404.1 |
| 2016/0330601 A1* | 11/2016 | Srivastava | H04W 4/22 |

* cited by examiner

*Primary Examiner* — Nam T Huynh
(74) *Attorney, Agent, or Firm* — Wate, Fressola, Maguire & Barber LLP

(57) ABSTRACT

Systems, methods, and devices for simultaneously distributing mass notifications to multiple users. A mass notification system receives input data and, based on this input data, creates notifications for mass distribution for urgent scenarios and emergency scenarios via Short Message Service (SMS) and/or Voice communication (audio recording or text to speech) The notifications are then transmitted to devices used by the users who are to be notified. The communication network control system confirms the indication of the emergency situation to the mobile device and notifies emergency personnel of the indication of the emergency situation. The communication network control system transmits an indication of the emergency situation to one or more additional mobile devices in the area. The message text and or voice recording is pre-configured/pre-set by the valid user. Target recipient groups for message/notification are also pre-configured/pre-set by the valid user.

9 Claims, 2 Drawing Sheets

OPTIMIZED URGENT SCENARIO AND EMERGENCY SCENARIO MASS/GROUP MESSAGING/NOTIFICATIONS/COMMUNICATIONS SERVICE EXPOSED/DELIVERED VIA WEB USER INTERFACE AND MOBILE DEVICE APPLICATION

FIELD OF THE INVENTION

The specification relates to a method, apparatus, and system for mass notification and instruction to mobile devices. In the event of an urgent scenario/event or emergency scenario/event, time sensitivity and emotional duress present the need for an optimized technological capability for notifying applicable recipient groups, agencies, and entities for response/management/safety of persons.

In one embodiment of this invention, the user could be notified that their mobile device requires a software, firmware and/or hardware upgrade to implement the present invention. This upgrade could be conducted by the individual's own mobile device provider. This would now be one of many mobile devices connected to the disclosed network that would be alerted at the approximately exact time emergency to user is discovered within the predetermined geographical range of the individual emergency notification system.

BACKGROUND OF THE INVENTION

A notification system is a combination of software and hardware that provides a means of delivering messages to a set of recipients. For example, notification systems can send emails or text messages or make phone calls with automated messages. The complexity of the notification system is often dependent on the application. The use of notification systems range from simple publicity applications (e.g. sending notifications of a new product or a sale) to emergency applications (e.g. notifying individuals of a dangerous situation).

With the pervasive use and high availability of different types of computing devices (e.g. Personal Computer, laptop, terminal connected to a server, dumb terminal, tablet computer, PDA, Internet Protocol phone, smartphone), the notification system needs to be capable of reaching any type of computing device at any time and adapting the presentation of the notification to the capability of the computing device for the notification to have the broadest reach.

Existing notification systems establish connectivity with the devices to be notified at the time of sending a notification. When used as an emergency application, there is a need to keep constant connectivity with all the computing devices that need to receive notifications and to ensure the mobile device and application are running the correct version of the notification client where applicable.

Notification systems are generally unidirectional, whereby the notification is broadcasted or dispatched to a set of devices and there is little to no capability to extract information from the recipient of the notification. As such, there is a need for bi-directional capability in an emergency system, to extract information from the recipient of the notification and to manage the extracted information. For example, in an emergency notification application, it would be of value to request an acknowledgment that a user has received the notification and to maintain a record of which users have acknowledged the notification.

SUMMARY OF INVENTION

The present invention provides systems, methods, and application for simultaneously distributing emergency notifications to multiple users. The emergency notification system receives input data and, based on this input data, creates notifications for mass distribution. The notifications are then transmitted by the users who are to be notified. The message text and or voice recording is preconfigured/pre-set by the valid user. Target recipient groups for message/notification are also pre-configured/pre-set by the valid user.

The system includes a Software as a Service (SaaS) interface, a web user interface (web application, website) or a mobile device application "authentication." "Authentication" is defined as valid/registered user ID and Password input, multi-digit PIN, or biometric authentication.

In a first aspect, the present invention provides a platform for sending notifications to a plurality of users, comprising:
A server locates mobile device and authenticate to device;
Next, the server opens mobile application for SAAS platform;
Furthermore, in an optional step, the server authenticates the sending message as user validate and verify group/mass communication/message/notification prior to distribution to defined recipient groups and entities.
Next, the user clicks a button on the user's device to send emergency notification;
Further action is validated and verified;
Message distribution is in progress and finds its end user;
Further, the server sends SMS and voice message to recipients; SMS and Voice message can be sent to Law enforcing agencies and Initiate/deploy urgent scenario or emergency scenario group/mass communication/messaging. Audience/recipient group can include emergency services (911, paramedics, federal agencies, state agencies). Example: Click "button" in SaaS application/website/web user interface/mobile application

BRIEF DESCRIPTION OF THE DRAWINGS

Embodiments are described with reference to the following figures, in which.

DETAILED DESCRIPTION OF THE DRAWINGS

The present invention will now be described with reference to FIGS. 1A, 1B and 2.

Figure 1A:
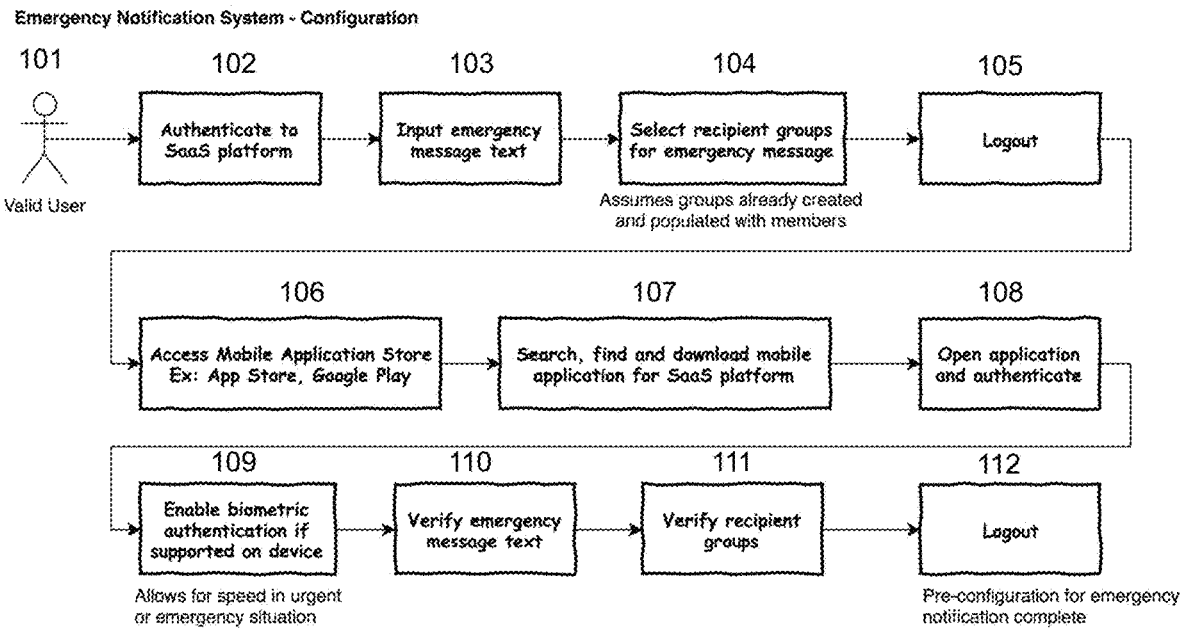
FIGS. 1A and 1B are schematic diagrams of a mass emergency notification system according to a non-limiting embodiment.
Figure 1B:
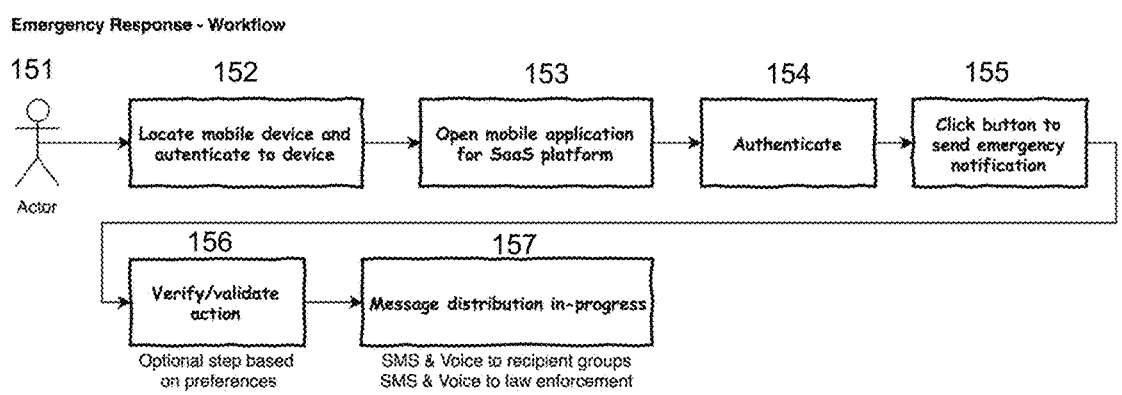

FIGS. 1A and 1B details two distinct workflows that are required for the invention "Optimized urgent scenario and emergency scenario mass/group messaging/notifications/communications service exposed/delivered via web user interface and mobile device application." The proper sequence for these workflows are first "Emergency Notification System-Configuration" and second "Emergency Response Workflow."

"Emergency Notification System-Configuration" (FIG. 1A)

Valid User (101): Valid user 101 represents an administrative user for an entity. Authenticate to Software as a Service (SaaS) platform (102): The valid user 101 would be authenticated using a valid identification (ID) and password to access a SaaS Platform interface, web user interface or mobile application interface.

Input Emergency message text (103): Once authenticated, the valid user 101 inputs the emergency message text. This emergency message text is the text that would be distributed as a mobile text message to recipient mobile phone numbers and associated mobile devices in the event of product/service usage.

Select recipient groups for emergency message (104): The valid user 101 then selects the recipient mobile phone numbers and/or groups of numbers that would receive the emergency message in the event of product/service usage.

Logout (105): The valid user 101 logs out from the SaaS platform.

Access Mobile Application Store (106)/Search, find and download application for SaaS platform (107): The valid user 101 can access/open the mobile application store (e.g. Apple iOS App Store, Google Play Store) and input the mobile application name into the search feature for the mobile application store.

Open application and authenticate (108): The valid user 101 opens the installed application and is again authenticated, such as with biometric authentication (109).

Verify emergency message text (110): The valid user 101 verifies the emergency message text.

Verify recipient groups (111): The valid user 101 verifies the recipient group names. Logout (112): The valid user 101 logs out when pre-configuration for emergency notification is complete.

"Emergency Response Workflow" (FIG. 1B)

FIG. 1B shows the emergency response workflow steps to be executed by an "Actor" 151 to send the emergency notification.

Locate mobile device and authenticate to device (152): The Actor 151 locates and authenticates to his or her device.

Open mobile application for SaaS platform (153): The "Actor" 151 opens the mobile application on the device to access the SaaS platform.

Authenticate (154): The Actor 151 inputs authentication data to access the SaaS platform.

Click button to send emergency notification (155): The Actor 151 clicks a button in the SaaS platform to initiate sending the emergency message.

Verify/validate action (156): The Actor 151 completes the optional step of validating or verifying the action to send the emergency message.

Message distribution in-progress (157): The emergency message is then distributed, including for example by SMS and Voice to the selected recipient groups and to law enforcement.

Figure 2:
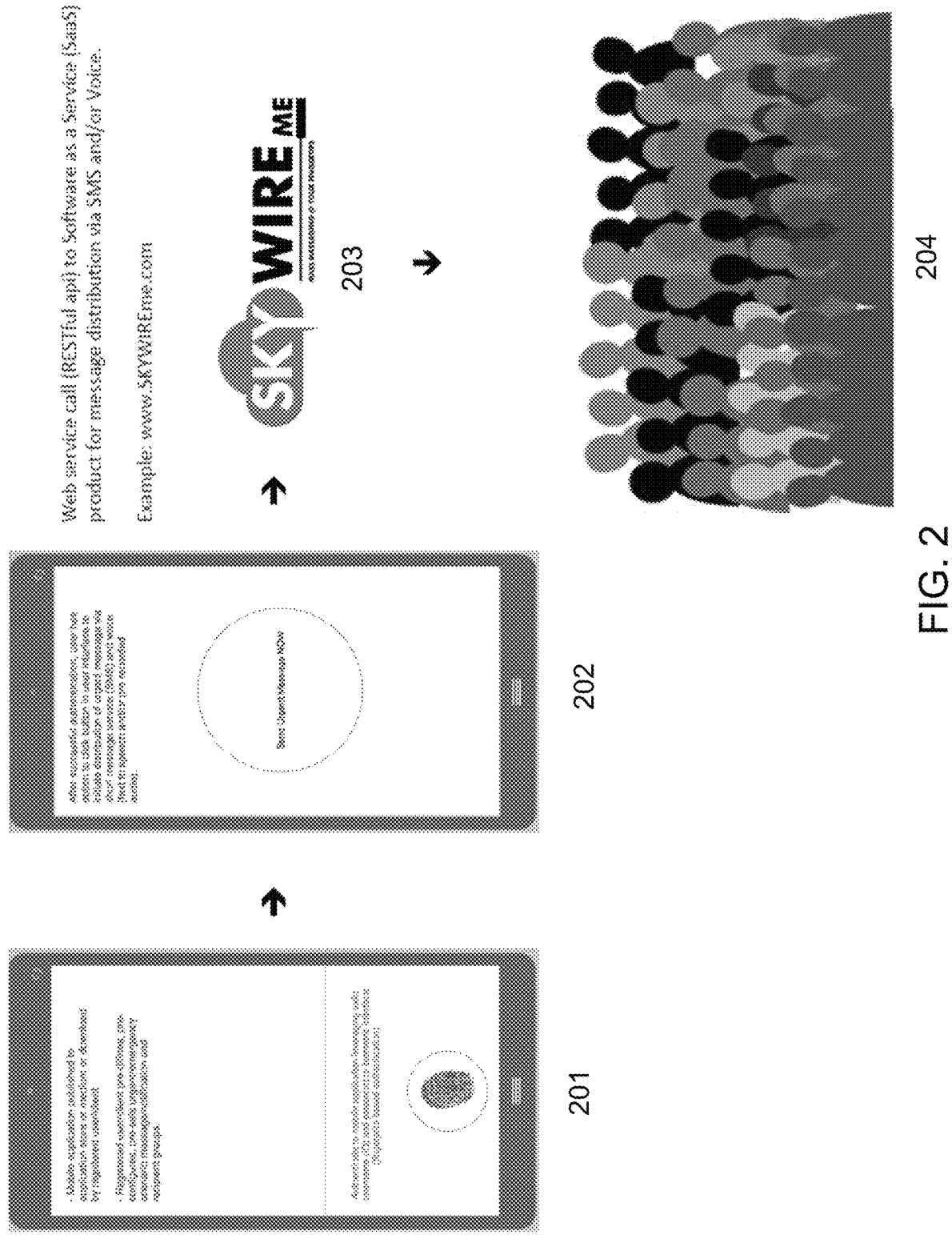
FIG. 2 is a block diagram of applications executable on an Emergency Work Flow of System (EWFS) of the system.

FIG. 2 illustrates the mobile application interface (201, 202) created for the product/service; integration with SaaS service platform (203) which are separate from the Actor mobile device; and illustrates text based message distribution to the message recipients (204).

I claim:

1. A method comprising:
   receiving, by a server, a first request to authenticate a first user at a first user device;
   authenticating the first user at the first user device and providing access to the first user at the first user device to a software as a service (SaaS) user interface displayed by the first user device;
   receiving, by the server, an emergency message text input in the SaaS user interface by the first user;
   receiving, by the server, a selection from the first user through the SaaS user interface of at least one group comprising a plurality of recipient devices to receive an emergency notification message comprising the emergency message text;
   receiving, by the server, a second request to authenticate a second user at a second user device;
   authenticating the second user at the second user device and providing access to the second user to the SaaS user interface displayed by the second user device;
   receiving, by the server from the second user device, a request to transmit the emergency notification message to the at least one group comprising the plurality of recipient devices; and
   transmitting the emergency notification message to each of the plurality of recipient devices.

2. The method according to claim 1, wherein authentication credentials of the first and second users comprise a user identification and a password.

3. The method according to claim 2, wherein the authentication credentials of the second user comprise a fingerprint-based authentication credential.

4. The method according to claim 1, wherein the emergency notification message sent to each of the plurality of recipient devices comprises an SMS and/or a voice message, each of the SMS and/or voice message comprising the emergency message text.

5. A server comprising at least one processor and memory stored with instructions, which when executed by the at least one processor, cause the server to perform:
   receiving a first request to authenticate a first user at a first user device;
   authenticating the first user at the first user device and providing access to the first user at the first user device to a software as a service (SaaS) user interface displayed by the first user device;
   receiving an emergency message text input in the SaaS user interface by the first user;
   receiving a selection from the first user through the SaaS user interface of at least one group comprising a plurality of recipient devices to receive an emergency notification message comprising the emergency message text;
   receiving a second request to authenticate a second user at a second user device;
   authenticating the second user at the second user device and providing access to the second user to the SaaS user interface displayed by the second user device;
   receiving a request from the second user device to transmit the emergency notification message to the at least one group comprising the plurality of recipient devices; and
   transmitting the emergency notification message to each of the plurality of recipient devices.

6. The server according to claim 5, wherein authentication credentials of the first and second users comprise a user identification and a password.

7. The server according to claim 5, wherein the authentication credentials of the second user comprise a fingerprint-based authentication credential.

8. The server according to claim 5, wherein the emergency notification message sent to each of the plurality of recipient devices comprises an SMS and/or a voice message, each of the SMS and/or voice message comprising the emergency message text.

9. A system comprising:
   a server;
   a first user device associated with a first user; and
   a second user device associated with a second user;
   wherein the first user device comprises at least one processor and memory stored with instructions, which when executed by the at least one processor of the first user device, cause the first user device to perform:

requesting authentication of the first user from the server to provide access to a software as a service (SaaS) user interface;

displaying the SaaS user interface on a display of the first user device; and receiving an emergency message text input in the SaaS user interface by the first user and a selection from the first user through the SaaS user interface of at least one group comprising a plurality of recipient devices to receive an emergency notification message comprising the emergency message text;

wherein the second user device comprises at least one processor and memory stored with instructions, which when executed by the at least one processor of the second user device, cause the second user device to perform:

requesting authentication of the second user from the server to provide access to a the SaaS user interface;

displaying the SaaS user interface on a display of the second user device; and receiving an input by the second user in the SaaS user interface requesting the server to transmit the emergency notification message to the at least one group comprising the plurality of recipient devices; and wherein the server comprises at least one processor and memory stored with instructions, which when executed by the at least one processor of the server, cause the server to perform:

storing the emergency message text input and the selection of the at least one group comprising the plurality of recipient devices to receive the emergency notification message comprising the emergency message text;

authenticating the second user at the second user device in response to the second user authentication request and enabling the second user to access the emergency message text input and the selection of the at least one group comprising the plurality of recipient devices input by the first user; and transmitting the emergency notification message to each of the plurality of recipient devices.

* * * * *